United States Patent
Visweswariah et al.

(10) Patent No.: US 8,781,792 B2
(45) Date of Patent: Jul. 15, 2014

(54) YIELD COMPUTATION AND OPTIMIZATION FOR SELECTIVE VOLTAGE BINNING

(75) Inventors: Chandramouli Visweswariah, Yorktown Heights, NY (US); Jinjun Xiong, Yorktown Heights, NY (US); Vladimir Zolotov, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 12/610,291

(22) Filed: Oct. 31, 2009

(65) Prior Publication Data

US 2011/0106497 A1    May 5, 2011

(51) Int. Cl.
G06F 11/30    (2006.01)

(52) U.S. Cl.
USPC ............ 702/182; 702/181; 702/117; 702/118

(58) Field of Classification Search
USPC .......................... 702/81, 117–118, 181–182
See application file for complete search history.

(56) References Cited

U.S. PATENT DOCUMENTS

| | | | |
|---|---|---|---|
| 7,363,176 | B2 | 4/2008 | Patel et al. |
| 7,475,366 | B2 | 1/2009 | Kuemerle et al. |
| 2005/0132306 | A1* | 6/2005 | Smith et al. ......... 716/1 |
| 2007/0143722 | A1* | 6/2007 | Venkateswaran et al. ........ 716/6 |
| 2007/0165343 | A1 | 7/2007 | Barowski et al. |
| 2008/0120065 | A1* | 5/2008 | Joshi et al. ............ 702/182 |
| 2009/0106714 | A1* | 4/2009 | Culp et al. ............ 716/5 |
| 2009/0182522 | A1* | 7/2009 | Visweswariah et al. ...... 702/117 |
| 2009/0217221 | A1 | 8/2009 | Anemikos et al. |
| 2009/0228843 | A1 | 9/2009 | Anemikos et al. |
| 2009/0271751 | A1* | 10/2009 | Fatemi et al. .................. 716/6 |
| 2010/0180243 | A1* | 7/2010 | Sinha et al. .................... 716/6 |

OTHER PUBLICATIONS

May et. al., Fundamentals of Semiconductor and Manufacturing and Process Control, 2006, John Wiley and Sons, pp. 152-154.*
Merriam Webster's Collegiate Dictionary, 1998, 10th edition, pp. 843.*
A. Datta et al., "Profit aware circuit design under process variations considering speed binning," IEEE Trans. on VLSI. vol. 16, No. 7, pp. 806-815 (Jul. 2008).
C. Neau et al., "Optimal body bias selection for leakage improvement and process compensation over different technology generations," ISLPED, pp. 116-121 (Aug. 2003).
T. Chen et al., "Comparison of adaptive body bias (ABB) and adaptive supply voltage (ASV) for improving delay and leakage under the presence of process variation," IEEE Trans. on VLSI, vol. 11, No. 5, pp. 888-899 (Oct. 2003).

(Continued)

*Primary Examiner* — John Breene
*Assistant Examiner* — Yaritza H Perez Bermudez
(74) *Attorney, Agent, or Firm* — Preston Young; Michael J. Chang, LLC

(57) ABSTRACT

Techniques for improving parametric chip yield of manufactured chips are provided. In one aspect, a method for optimizing parametric chip yield is provided. The method includes the following steps. Parametric chip yield is computed based on performance and power consumption of a plurality of manufactured chips subject to a given voltage binning scheme. It is then determined whether the parametric chip yield computed is optimal. If the parametric chip yield is not optimal, the voltage binning scheme is altered and the compute and determine steps are repeated. Otherwise the binning scheme is left unaltered.

15 Claims, 11 Drawing Sheets

(56) References Cited

OTHER PUBLICATIONS

J.W. Tschanz et al., "Effectiveness of adaptive supply voltage and body bias for reducing impact of parameter variations in low power and high performance microprocessors," IEEE Journal of Solid State Circuits. vol. 38, No. 5, pp. 826-829 (May 2003).

C. Visweswariah et al., "First-order incremental block-based statistical timing analysis," DAC, pp. 331-336, San Diego, CA (Jun. 2004).

R.R. Rao et al., "Modeling and analysis of parametric yield under power and performance constraints," IEEE Design & Test of Computers, pp. 376-385 (Jul. 2005).

R.R. Rao et al., "Analytical yield prediction considering leakage/performance correlation," IEEE Transactions on CAD, vol. 25, No. 9, pp. 1685-1695 (Sep. 2006).

R. Chen et al., "Static timing: back to our roots," ASP-DAC, pp. 310-315 (2008).

A. Srivastava et al., "A novel approach to perform gate-level yield analysis and optimization considering correlated variations in power and performance," IEEE Trans. on CAD, vol. 27, No. 2, pp. 272-285 (Feb. 2008).

W.H. Press et al., "Numerical Recipes in C, the art of scientific computing" Cambridge University Press (1992).

A. Srivastava et al., "Accurate and Efficient Gate-Level Parametric Yield Estimation Considering Correlated Variations in Leakage Power and Performance," DAC, pp. 535-540 (Jun. 13-17, 2005).

M. Mani et al., "A Statistical Algorithm for Power- and Timing-Limited Parametric Yield Optimization of Large Integrated Circuits," IEEE Transactions on Computer-Aided Design of Integrated Circuits and Systems, vol. 26, No. 10 (Oct. 2007).

* cited by examiner

200

300

400

500

600

700

1000A

1000B

1000C

1100

1200

1300

PERCENT YIELD FOR DIFFERENT VOLTAGE BINNING SCHEMES

| DESIGN | ADJ Vdd | 1 BIN | 2 BINS | 3 BINS | 5 BINS | 10 BINS |
|--------|---------|-------|--------|--------|--------|---------|
| CHIP1  | 97.8    | 63.2  | 82.9   | 89.8   | 94.2   | 96.5    |
| CHIP2  | 97.9    | 66.9  | 85.0   | 90.0   | 94.8   | 96.8    |
| CHIP3  | 99.4    | 44.0  | 68.9   | 81.7   | 92.2   | 97.9    |

1400

1500

1600

PERCENT YIELD DEPENDENCE ON POWER REQUIREMENTS

| POWER CONSTR | ADJ Vdd | 1 BIN | 2 BINS | 3 BINS | 5 BINS | 10 BINS |
|---|---|---|---|---|---|---|
| 100% | 97.8 | 63.2 | 82.9 | 89.8 | 94.2 | 96.5 |
| 95% | 94.9 | 54.2 | 74.1 | 82.1 | 89.5 | 91.8 |
| 90% | 87.4 | 44.1 | 62.7 | 71.2 | 78.4 | 83.5 |
| 85% | 76.5 | 33.4 | 49.3 | 57.3 | 64.8 | 70.7 |
| 80% | 61.1 | 23.8 | 35.2 | 41.8 | 48.6 | 54.4 |
| 75% | 44.1 | 14.3 | 22.3 | 27.1 | 32.2 | 37.1 |

YIELD COMPUTATION AND OPTIMIZATION FOR SELECTIVE VOLTAGE BINNING

FIELD OF THE INVENTION

The present invention relates to increasing parametric chip yield, and more particularly, to techniques for computing and optimizing parametric chip yield through optimized voltage binning methods.

BACKGROUND OF THE INVENTION

Process variation during chip manufacture is recognized as a major source of parametric yield loss. In the future, due to scaling down of complementary metal-oxide semiconductor (CMOS) transistor sizes, the situation is expected to get worse. Process variation causes high variability in gate delays and leakage current, which leads to high variability of chip operational frequency and power consumption. Due to chip-to-chip and within chip (intra-chip) variability, only some manufactured chips satisfy both performance and power requirements. The rest are either too slow or consume too much power. It is these non-compliant chips that represent parametric yield loss.

A number of approaches have been proposed to address this problem. A conservative design approach sets chip timing and power to a stricter target than required. To illustrate this point, ideally there would be no variability and chip timing and power requirements would just come from the specifications on the chip. If, however, due to variability the power varies, e.g., by 25 percent (%), and performance varies, e.g., by 20%, then in order to make all chips operational the chips have to be designed to be 25% faster than is required and consume 20% less power than is required. The main disadvantages of this approach are larger chip area and higher design costs.

Another approach, speed binning, reduces parametric yield loss by accepting low performance chips and selling them at discount price. See, for example, A. Datta et al., "Profit aware circuit design under process variations considering speed binning," IEEE Trans. on VLSI vol. 16, no. 7, pgs. 806-815 (July 2008). However, application-specific integrated circuit (ASIC) chips often have strict requirements for frequency and power. Chips not satisfying those frequency and power requirements have no value at all. Additionally, selling chips at a discount price reduces profits.

Yet another approach, body biasing, (see, for example, C. Neau et al., "Optimal body bias selection for leakage improvement and process compensation over different technology generations," ISLPED, pgs. 116-121 (August 2003) and T. Chen et al., "Comparison of adaptive body bias (ABB) and adaptive supply voltage (ASV) for improving delay and leakage under the presence of process variation," IEEE Trans. on VLSI, vol. 11, no. 5, pgs. 888-899 (October 2003) (hereinafter "T. Chen")) either reduces transistor leakage or improves gate delays. This approach requires connecting transistor bodies to a biasing voltage source. The wiring needed to do this, however, negatively affects chip routability, as well as increases design time and cost and is impractical for silicon-on-insulator (SOI) technology.

Therefore, improved techniques for reducing parametric yield loss would be desirable.

SUMMARY OF THE INVENTION

The present invention provides techniques for improving parametric chip yield of manufactured chips. In one aspect of the invention, a method for optimizing parametric chip yield is provided. The method includes the following steps. Parametric chip yield is computed based on performance and power consumption of a plurality of manufactured chips subject to a given voltage binning scheme. It is then determined whether the parametric chip yield computed is optimal. If the parametric chip yield is not optimal, the voltage binning scheme is altered and the compute and determine steps are repeated. Otherwise the binning scheme is left unaltered.

A more complete understanding of the present invention, as well as further features and advantages of the present invention, will be obtained by reference to the following detailed description and drawings.

DETAILED DESCRIPTION OF PREFERRED EMBODIMENTS

Figure 1:
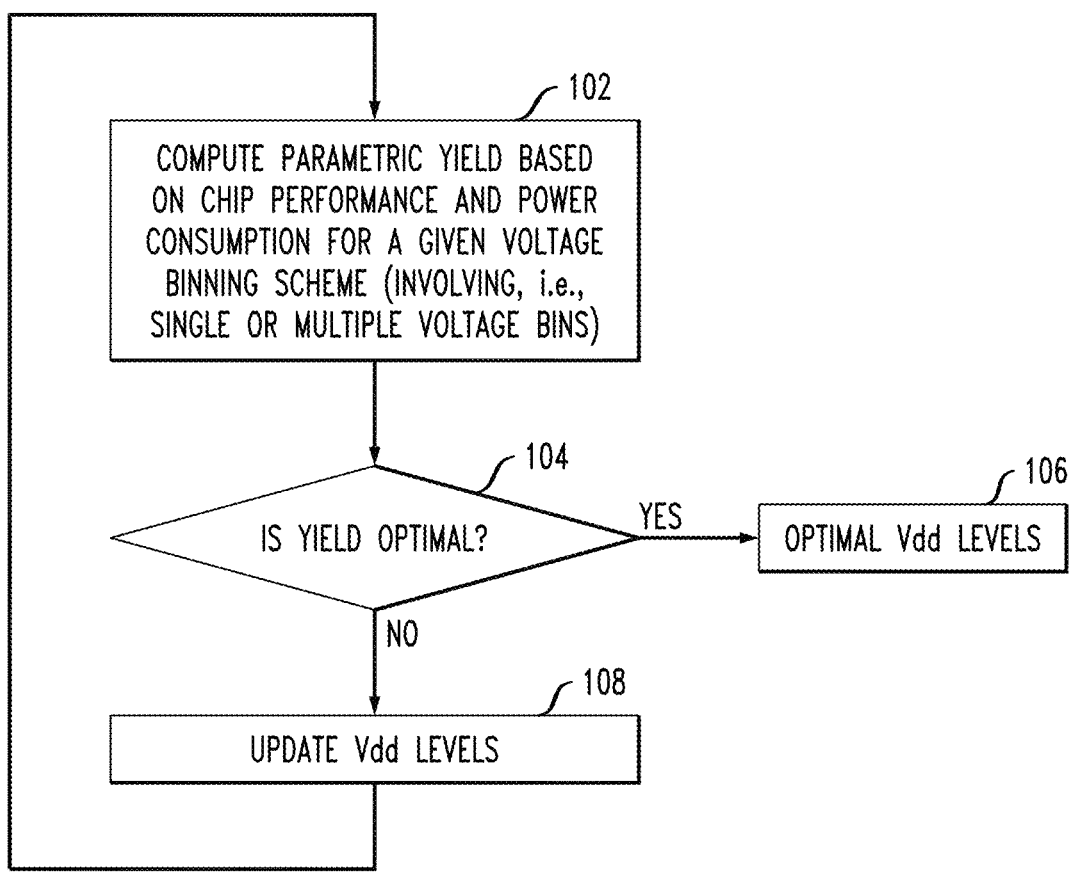
FIG. 1 is a diagram illustrating an exemplary methodology for optimizing parametric yield of manufactured chips according to an embodiment of the present invention.

FIG. 1 is a diagram illustrating exemplary methodology 100 for optimizing parametric yield of manufactured chips. As highlighted above, process variation is recognized as a major source of parametric yield loss, which occurs because a fraction of manufactured chips do not satisfy timing or power constraints. On the other hand, both chip performance and chip leakage power depend on supply voltage (Vdd). This dependence can be used for converting the fraction of too slow or too 'leaky' (i.e., leakage power is too high) chips into good, usable ones by adjusting their supply voltage. This technique is called voltage binning. See, for example, U.S. Pat. No. 7,475,366 issued to Kuemerle et al., entitled "Integrated Circuit Design Closure Method for Selective Voltage Binning" (hereinafter "Kuemerle"), wherein all manufactured chips are divided into groups (bins) and each group is assigned a supply voltage. Kuemerle, however, does not analyze how to select optimal values of supply voltages and how much improvement is possible through different voltage binning schemes.

The present teachings advantageously provide a statistical technique of yield computation for different voltage binning schemes using the results of statistical timing and variational power analysis. The present teachings formulate and solve the problem of computing optimal supply voltages for a given binning scheme.

In step 102 of FIG. 1, parametric yield is computed for a plurality of manufactured chips subject to a given voltage binning scheme. Basically, in this step, what is being determined is what fraction of the chips manufactured fall within one of the voltage bins for the particular voltage binning scheme being used. As will be described in detail below, this calculation will reveal whether the given voltage binning scheme provides the optimal yield, or whether alterations to the binning scheme, for example, altering the voltage assignment of one or more of the bins and/or changing (increasing/decreasing) the number of bins can be implemented to increase the chip yield.

Any known voltage binning scheme can be used to initially categorize the chips. By way of example only, suitable voltage binning schemes include, but are not limited to, those schemes employing single or multiple voltage bins (including those employing individually adjustable supply voltage (i.e., adjusting the supply voltage for each chip individually)). An exemplary voltage binning scheme is described in conjunction with the description of FIG. 5, below.

Voltage binning exploits the fact that both chip performance and power consumption depend on supply voltage. Higher supply voltage improves chip performance but increases both leakage and switching power. See, for example, J. W. Tschanz et al., "Effectiveness of adaptive supply voltage and body bias for reducing impact of parameter variations in low power and high performance microprocessors," IEEE Journal of Solid State Circuits. vol. 38, no. 5, pgs. 826-829 (May 2003) (hereinafter "Tschanz").

On the other hand, slow chips often have low leakage and chips with high leakage often have higher performance. Therefore, by adjusting supply voltage it is possible to make initially failing chips satisfy application constraints. Because all of the accepted chips satisfy these constraints they have the same value and can be sold at the same price. Supply voltage adjustment does not require either additional circuitry or additional wiring on the chip.

There are different schemes of supply voltage adjustment. For example, it is possible to assign an individual supply voltage to each manufactured chip. See, for example, Tschanz and T. Chen. Assigning an individual supply voltage to each chip, however, requires significant effort for chip testing at different supply voltages. Voltage binning is an alternative technique. Voltage binning divides all manufactured chips into several bins and assigns some value of supply voltage to each bin. Voltage binning is more practical at the cost of small yield reduction.

The techniques that are used herein for computing parametric chip yield or simply chip yield will be described in detail below. In general however, the chip yield is represented by an integral over process variation space. Monte-Carlo is the most obvious method for computing such integrals. However, the Monte-Carlo method is rather slow and requires a large number of samples to ensure accuracy. Besides, Monte-Carlo computation has significant random numerical noise, and even small random noise severely interferes with an optimization procedure. Therefore, a combination of analytical and numerical techniques are being presented herein for accurate and efficient calculation of chip yield (although a pure numerical technique may also be used herein as this would be an extension of the combined analytical/numerical techniques). By applying the present chip yield computation techniques, the problem of an optimal voltage binning scheme, i.e., computing optimal voltage levels, is also solved.

As will be described in further detail below, the parametric chip yield is computed herein based on chip performance and power consumption. A functional representation of chip performance and power consumption is used. Chip performance can be measured as a function of timing slack (see below). Statistical static timing analysis (SSTA) gives chip performance computed as a linear form of process variables. See, for example, C. Visweswariah et al., "First-order incremental block-based statistical timing analysis," DAC, pgs. 331-336, San Diego, Calif. (June 2004) (hereinafter "Visweswariah"). Visweswariah describes that SSTA models delays and slews of digital cells in linear form (also referred to as "linear canonical form" in Visweswariah). By substituting actual values of parameters (i.e., variables describing variational parameters of transistors and interconnects) in this linear form, one can get delays and slews corresponding to these parameters. However, the present teachings can be extended to work with more complex models of delays and slews of digital cells. Another assumption of SSTA is that the parameters in this form are random variables describing variational parameters of transistors and interconnects. Visweswariah assumes that these parameters have Gaussian distributions. However, the present teachings can be extended beyond this assumption.

Based on these assumptions, SSTA computes arrival times (ATs) at data and clock inputs of latches. These ATs are computed in the same linear form as functions of those parameters. This computation uses approximations based on the above assumption of the random nature of variations. ATs of data and clock signals at latch are compared to satisfy timing constraints, required for correct operation of each latch. As a result of this comparison, the timing slack is computed in the same linear form. The timing slack shows how much extra time there is for latch to function correctly. If this extra time is zero it means latch and the corresponding circuit feeding this latch work exactly at the maximum possible frequency. If slack is negative, the circuit cannot work at this frequency. So there is a simple relation between timing slack and minimum clock period (maximum clock frequency) at which a circuit can function correctly.

Chip power analysis is not a primary goal of the present teachings. Therefore, details regarding aspects of chip power analysis, such as computation of switching activity or probability of different leakage states, are not discussed. However, in order to make the present parametric yield computation sufficiently realistic an adequate model of chip power consumption has to be used, such as a model that takes into account both switching and leakage power (see below). Switching power is expressed as a function of supply voltage, gate load and wire capacitancies.

Modeling of chip leakage power has attracted the attention of many authors. By way of example only, a convenient representation of chip leakage is given by R. R. Rao et al., "Modeling and analysis of parametric yield under power and performance constraints," *IEEE Design & Test of Computers*," pgs. 376-385 (July 2005) (hereinafter "Rao 2005") and R. R. Rao et al., "Analytical yield prediction considering leakage/performance correlation," *IEEE Transactions on CAD*, vol. 25, no. 9, pgs. 1685-1695 (September 2006) (hereinafter "Rao 2006") which show that leakage current can be approximated as an exponent of transistor channel length. That representation is then used for yield computation. In Rao 2005 and Rao 2006, it is first assumed that chip frequency depends only on a particular transistor channel length. This is a rather significant simplification that is not used in the present teachings. Then, based on the fact that the dependence is exponential, leakage distribution is approximated by log normal distribution. Leakage currents of all gates are summed as log normal distributions, again assuming the result to be log normal. This is a very large simplification which leads to large error.

As such, a more accurate model is needed here. Therefore, two modifications of the leakage computation technique are made. It is shown in Rao 2006 that leakage depends exponentially on channel length and supply voltage and their squares. Based on this fact, it is assumed herein that leakage (power consumption) can be expressed in a parameterized form. For example, leakage can be approximated as the exponent of a quadratic form of channel length (Leff) and Vdd, which is a generalization of the form given in Rao 2006. This function approximates chip leakage with less than one percent (%) error. This is the first modification of the leakage computation technique that was made. This additional generalization (cross-terms between voltage and channel length in the exponential dependence) increases flexibility of the formula and its ability to be better fitted to the values obtained from simulation program with integrated circuit emphasis (SPICE) simulations. Next, this function is fit to actual leakage current obtained by simulation of the gate circuit by a circuit simulator SPICE. This fitting gives very small approximation error for wide range of channel length and voltage values. Instead of probability density function (PDF) of chip leakage, its functional expression is used directly. This is the second modification of the leakage computation technique that was made.

After the chip yield is computed for the given voltage binning scheme, in step 104 a determination is made as to whether or not the given voltage binning scheme results in optimal chip yield, or whether adjustments can be made to the voltage binning scheme to improve yield. The techniques for making this determination are described in further detail below. If the binning scheme used provides optimal chip yield, then in step 106, the voltage binning scheme is considered optimal (and is left unaltered) and the process is ended. However, on the other hand, if the binning scheme used does not result in an optimal chip yield, then in step 108, the binning scheme is altered, for example, by altering the voltage assignment of one or more of the bins and/or changing (increasing/decreasing) the number of bins. Techniques for determining how to alter the bins is described in further detail below. Steps 102-108 are then repeated until the binning scheme (now altered) results in the optimal chip yield (as in step 106).

Figure 2:
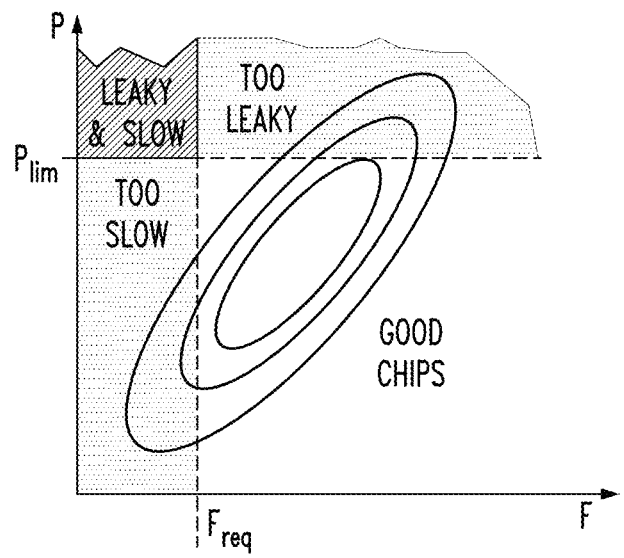
FIG. 2 is a contour plot of a joint probability density function (JPDF) of chip frequency and power for some given supply voltage (Vdd) value according to an embodiment of the present invention.

Timing and power models that may be used in determining parametric chip yield will now be described. For computing and optimizing chip yield corresponding to different voltage binning schemes proper performance and power statistical models are needed, parameterized by supply voltage. One such model is a joint distribution of chip operational frequency and power consumption. FIG. 2 is a contour plot 200 of the joint probability density function (JPDF) of chip frequency and power for some given Vdd value. The area of plot 200 is divided into four regions with lines $F=F_{req}$ and $P=P_{lim}$ indicating chip performance (frequency) and power requirements, respectively.

The region labeled "Good Chips" represents those chips satisfying application requirements. The integral of the JPDF over this "Good Chips" region gives manufacturing yield. The region marked "Leaky & Slow" represents those chips that are too slow and have too high leakage. These chips cannot be fixed by adjusting supply voltage. The region marked "Too leaky" represents those chips that consume too much power due to leakage but have sufficiently high operational frequency. Some of these chips can be fixed by lowering supply voltage and some possibly cannot. For example, if a chip is very leaky and not fast enough, when voltage is reduced the chip gets too slow before the leakage gets small enough. The region marked "Too slow" represents those chips that do not satisfy performance requirements but consume less power than allowed. Some of these chips can be fixed by increasing supply voltage and some possibly cannot.

While the power-performance space shown in FIG. 2 is helpful for visualizing chip distribution, it is not convenient for actual chip yield computation. First, due to highly nonlinear dependence of chip leakage on Leff it is very difficult to represent the JPDF of power and performance numerically or analytically even for fixed Vdd. Second, there are no convenient mathematical tools to operate with a JPDF parameterized by Vdd. Because of that, the analysis performed herein is done in the space of sources of variation and Vdd by way of a timing model (for measuring performance) and a power model (for measuring power consumption). For simplicity, it is assumed that all variational parameters have normal Gaussian distributions.

The timing model is now described. Traditionally, performance of a chip is expressed by its clock frequency. However, the results of timing are expressed in terms of timing slack. Minimization of clock period is equivalent to maximization of timing slack. Therefore, for convenience, timing slack is used instead of clock frequency. Statistical timing computes timing slack S in linear form (see description of Visweswariah above):

$$S = S_0 + \sum_{i=1}^{n} a_i \Delta X_i + a_R \Delta R, \tag{1}$$

wherein $S_0$ is the mean value of chip slack, $\Delta X_i$ is chip-to-chip variation of parameter $X_i$, $\Delta R$ is uncorrelated variation summing effects of all intra-die variations, $a_i$ and $a_R$, respectively, are the sensitivities to these variations. Spatial variation is computed as it is described in R. Chen et al., "Static timing: back to our roots," *ASP-DAC*, pgs. 310-315 (2008) (hereinafter "R. Chen") and is included in uncorrelated variation $\Delta R$ because spatial variation does not affect chip-to-chip variation.

In R. Chen, spatial variation is modeled by covering chip area with a grid of cells and assigning a random variable to each cell. Spatial variation of a gate in a grid cell i is then represented as a linear combination of the random variables of this cell i and their immediate neighbors. Then the correlation between two gates depends on how many common neighboring cells they have, which depends on how close these gates are to each other on the chip. So this technique can model spatial variation.

With the present teachings, after representing spatial variation in terms of a linear combination of independent variables corresponding to grid cells, statistical timing can be done with spatial variation as it is described in R. Chen and above. The statistical timing computes slack in the linear form, part of which is a combination of those spatial variables corresponding to grid cells. This part represents the spatial variation. However, there is another approach of modeling spatial variation when the variations corresponding to each cell are transformed into a set of independent variations by linear transformation, called principal component analysis. Then again statistical timing can be performed using these independent variations. The present teachings do not depend on the way spatial variations are modeled. Therefore, the spatial variation model of R. Chen is mentioned by way of example only.

Special consideration is given to chip-to-chip variations of supply voltage $\Delta V$ and transistor channel length $\Delta L$. All other sources of variations are combined into a single parameter $\Delta X$, using the fact that linear combination of Gaussian random variables is also a Gaussian random variable. Threshold voltage variation due to random dopant fluctuation is included in the uncorrelated variation modeling all the intra-chip variations. Statistical timing slack is then expressed as follows:

$$S = S_0 + a_V \Delta V + a_L \Delta L + a_X \Delta X, \quad (2)$$

wherein $a_V$, $a_L$, and $a_X$ are sensitivities of timing slack to Vdd, Leff and the combined variational parameter $\Delta X$, respectively. The sensitivity $a_V$ with respect to Vdd can be computed either by pure statistical timing considering Vdd a statistical variable or from two statistical timing procedures performed at low and high Vdd values.

The power model is now described. Total chip power $P_{Tot}$ is expressed as $P_{Tot} = P_s + P_l$, wherein $P_s$ is switching or dynamic power and $P_l$ is leakage power due to sub-threshold and gate leakage. Chip switching power $P_s$ is expressed as:

$$P_s = \sum_{i=1}^{n} s_i F C_i \frac{V^2}{2} = \alpha \frac{V^2}{2}, \quad (3)$$

wherein $s_i$ and $C_i$ are switching activity and load capacitance of an $i^{th}$ gate, respectively, F is chip frequency, V is supply voltage and $\alpha$ is a coefficient obtained by summing all terms together.

From Equation 3 one can get a variational form of chip switching power $$P_s = P_{s,0} + c_V \Delta V + c_{vv} \Delta V^2, \quad (4)$$

wherein $P_{s,0}$ is switching power at nominal Vdd, $\Delta V$ is the variation of Vdd, $c_v$ and $c_{vv}$ are constant coefficients. Chip leakage current $I_{chip}$ is expressed as:

$$I_{chip} = V \sum_{i=1}^{n} \sum_{j=1}^{k_i} p_{i,j} I_{i,j}, \quad (5)$$

wherein $I_{i,j}$ is leakage of an $i^{th}$ gate in a $j^{th}$ leakage state, $p_{i,j}$ is a probability of that state occurrence and $k_i$ is a number of leakage states of the $i^{th}$ gate.

A. Srivastava et al., "A novel approach to perform gate-level yield analysis and optimization considering correlated variations in power and performance," IEEE Trans. on CAD, vol. 27, no. 2, pgs. 272-285 (February 2008) proposes approximating the leakage of each gate with a log-normal distribution. The total chip leakage is computed iteratively by summing many log-normal distributions. The resulting sum is approximated by a log-normal distribution using a modified Wilkinson's method. This approach has two sources of error. First, the use of log normal distributions corresponds to approximation of leakage current with the exponent of a linear function. It has been found to be not accurate, especially when leakage is considered as a function of Vdd and Leff. This fact is confirmed by Rao 2006 which shows that it is necessary to use the exponent of a quadratic function of Leff. The second source of error is the approximation of the sum of several log-normal random variables by a log-normal variable again. With the instant techniques the situation is even more complex because Vdd is being considered as a parameter. Therefore, an alternative technique was developed for use herein.

Figure 3:
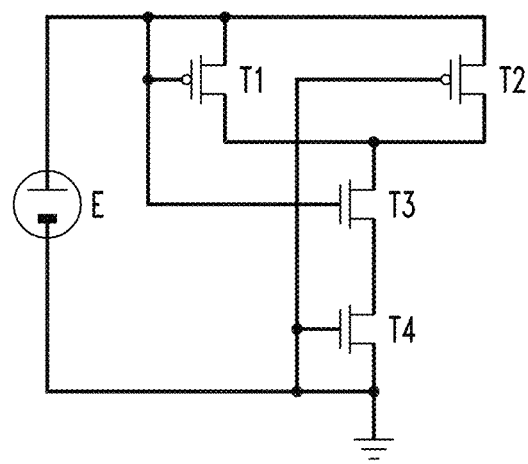
FIG. 3 is a diagram illustrating an exemplary characterized circuit according to an embodiment of the present invention.

Using SPICE simulations, a leakage current of each type of gate is characterized in each possible leakage state. FIG. 3 is a diagram illustrating exemplary characterized circuit 300 having transistors T1-T4. Leakage current is measured as current flowing through voltage source E. Thus both sub-threshold and transistor gate leakage currents are measured together. Leakage current is measured for all required values of Vdd and Leff. The characterization results are represented by a two-dimensional table (not shown). The next step is to numerically sum the leakage tables of all gate types and all their leakage states weighted by the corresponding coefficients $P_{i,j}$ from Equation 5, above. This operation does not incur any additional approximation error. The resulting table is fitted to the exponent of a quadratic form of Vdd and Leff:

$$I_{chip} = I_0 e^{a_{ll}L^2 + a_{vv}V^2 + a_{lv}LV + a_l L + a_V V} \quad (6)$$

where L and V are values of transistor channel length and chip supply voltage, respectively, $I_0$, $a_{ll}$, $a_{vv}$, $a_{lv}$, $a_l$, $a_v$ are fitting coefficients.

Assuming variational representations of Vdd and Leff in the form $V = V_0 + \Delta V$, $L = L_0 + \Delta L$, the variational form of leakage power $P_l$ is derived as follows:

$$P_l = V \cdot I_l(V,L) = (V_0 + \Delta V) \cdot I_l(V_0 + \Delta V, L_0 + \Delta L) = \\ I_{nom} \cdot (V_0 \Delta V) \cdot e^{b_{ll} \Delta L^2 + b_{vv} \Delta V^2 + b_{lv} \Delta L \Delta V + b_l \Delta L + b_v \Delta V} \quad (7)$$

wherein $I_{nom}$ is the leakage current at the nominal Vdd and Leff:

$$I_{nom} = I_0 e^{a_{ll}L_0^2 + a_{vv}V_0^2 + a_{lv}L_0 V_0 + a_l L_0 + a_v V_0} \quad (8)$$

and $b_{ll}$, $b_{vv}$, $b_{lv}$, $b_l$ and $b_v$ are coefficients computed from the coefficients $a_{ll}$, $a_{vv}$, $a_{lv}$, $a_l$ and $a_V$, respectively. Quadratic terms of variations are preserved because they are too large to be neglected.

Variational form of total chip power can be obtained by summing Equations 4 and 7, above. This variational form of the total chip power formula is used for the present computational experiments. However, all the formulations and derivations herein are general enough for chip power expressed by an arbitrary function of Vdd and Leff.

Intra-chip variation of leakage current is not considered. Total chip leakage is the sum of leakage currents of a large number $N_G$ of gates. Variance of chip-to-chip leakage variation is proportional to the number of gates $N_G$ while variance of intra-chip leakage variation is proportional to $\sqrt{N_G}$. Therefore, the contribution of intra-chip variation into the correlation between the chip slack and leakage is small as compared with the contribution of chip-to-chip variation. Spatial variation does not have a high impact on this correlation because the number of spatially independent regions on a chip is also large (at least hundreds). The main impact of intra-chip variability is a small change of mean value. The computation of this adjustment is explained in Rao 2006. The total leakage of the chip is a sum of individual leakages of chip cells. This adjustment is a sum of millions of values representing intra-chip variability of each cell. Due to Central Limit theorem the variance of this sum is very small comparing with the mean value of the sum. Therefore, this adjustment can be computed as a sum of mean values of intra-chip variability values corresponding to each cell of the chip. The mean value of the sum of random variables is a sum of mean values of this variables. As it is shown in Rao 2006, mean value of intra-chip variability of cell leakage is expressed by a two-dimensional integral. This integral can be computed either analytically or numerically depending on complexity of expression of intra-chip variability. This computation should be done only once for each library cell of the chip. Therefore, it does not represent any difficulties.

Figure 4:
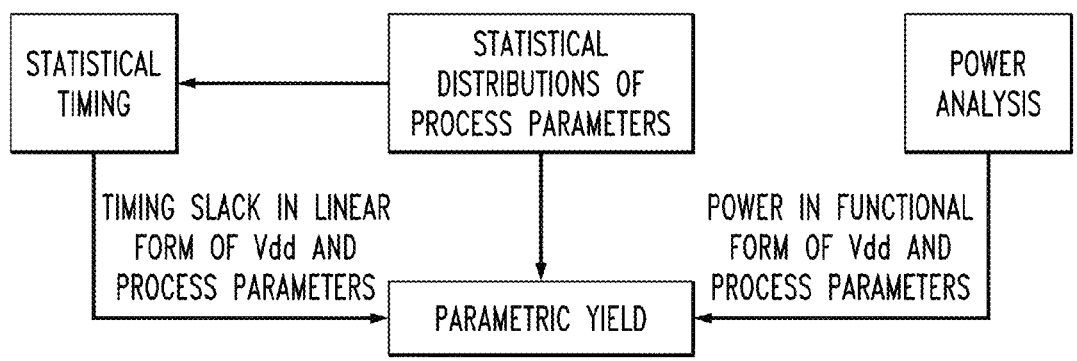
FIG. 4 is a schematic diagram illustrating that statistical timing and power analysis factor into chip yield computation according to an embodiment of the present invention.

FIG. 4 is schematic diagram 400 illustrating that the above-described timing and power models factor into chip yield computation. As described above, timing slack is computed in a linear form of supply voltage and process parameters, and power consumption is computed in a functional form of supply voltage and process parameters. As will be described in detail below, constraints on an area where chips satisfy timing and power constraints (i.e., the area representing chip yield) can be derived from Equation 2 above for statistical timing slack and from total chip power as a function of Leff variation. As shown in FIG. 4, statistical distributions of process parameters are used for numerically computing statistical timing and chip yield. Equation 10 (shown below) and equations derived therefrom are integrals of statistical distributions of process parameters over the area corresponding to the values of the parameters resulting in acceptable leakage and timing slack (performance).

All of the computations being performed here are based on transistor and interconnect models constructed from actual measurements. Usually, a transistor model is constructed at the time a new process technology is developed and introduced. Test chips are then manufactured and measured. Transistor parameters are extracted from these measurements and incorporated into a transistor model. Similarly, interconnect parameters are also extracted from measurements of manufactured chips and then incorporated into an interconnect model. Such transistor and interconnect models are well known to those of skill in the art and are widely used in chip design processes.

During subsequent chip manufacturing, the manufacturing process is constantly controlled so as not to deviate significantly from these models. However, some variability always exists. This variability affects chip performance and power consumption, and through these parameters chip yield is affected.

The present teachings use the same concepts of transistor and interconnect models as was just described. Using these models, for example, transistor circuits can be simulated by a circuit simulator (SPICE) (see above) and leakage values can be obtained corresponding to different values of main transistor parameters. Similarly, using transistor and interconnect parameters, the timing models of digital cells (logic gates and latches) are characterized (again using a circuit simulation by SPICE). Further, the transistor and interconnect models can be used by a statistical timing analyzer to produce statistical timing slack in the above-described linear form.

Definitions of voltage binning schemes will now be provided and problems of computation and optimization of yield will be formulated. For voltage binning there are two main problems, for which solutions are herein presented. The first problem is yield computation for a given voltage binning scheme. The second problem is computation of an optimal voltage binning scheme given a required number of voltage bins. In order to solve these problems, a definition of a voltage binning scheme is given and its properties are analyzed.

A voltage binning scheme is defined herein as a set of supply voltage levels $\hat{V}=\{V_1, V_2, \ldots, V_n\}$, a set of bins $\hat{U}=\{U_1, U_2, \ldots, U_n\}$ corresponding to these voltage levels and a binning process A, which distributes manufactured chips among the bins. The binning process A assigns chips to bins so that any chip assigned to bin $U_i$ meets both the timing and power constraints at the supply voltage $V_i$ corresponding to this bin. The chips not assigned to any bin constitute yield loss. From the definition of a voltage binning scheme, it can be seen that yield computation depends on two separate factors: the bin voltage levels and the binning process. For the same set of bin voltage levels, there are many different binning processes. These binning processes may produce different yield. It makes sense to consider only the binning processes producing the maximum possible yield. Fortunately, the criterion for optimality of a binning process is simple. An optimal binning process must not put good chips in yield loss. In other words, any chip for which there exists at least one bin, where the chip satisfies timing and power constraints, should be assigned to some bin. Obviously any chip assignment to voltage bins satisfying this criterion cannot be improved because no chip from the yield loss bucket can be assigned to a voltage bin without violating either the power or timing constraints.

Figure 5:
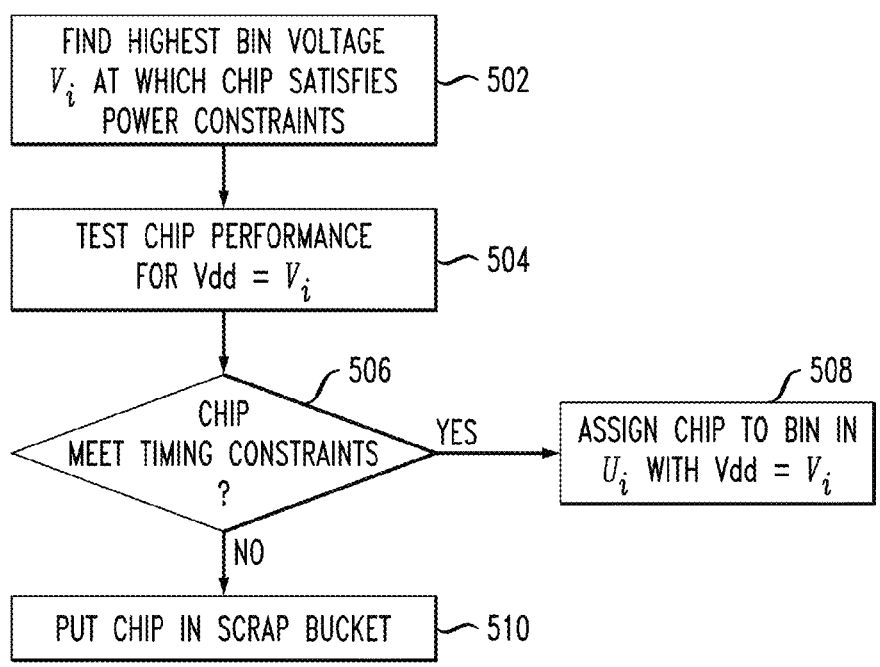
FIG. 5 is a diagram illustrating an exemplary binning process according to an embodiment of the present invention.

The present computation and optimization techniques are based on a binning process like that shown in FIG. 5. Specifically, FIG. 5 is a diagram illustrating exemplary binning process 500. In step 502, for a manufactured chip, the highest bin voltage $V_i$ at which the chip satisfies power constraints is found. In step 504, chip performance is tested for Vdd=$V_i$. In step 506, a determination is made as to whether or not the chip meets the timing (performance) constraints. If the chip meets the timing constraints, then in step 508 the chip is assigned to the bin $U_i$ with Vdd=$V_i$. Otherwise, in step 510, the chip is put in the scrap bucket (rejected).

Usually chip power and performance are increasing functions of Vdd. Therefore, this voltage binning process produces optimal chip assignment to voltage bins. The simplicity of this voltage binning process makes yield computation convenient. It does not mean that the actual binning should be done by this exact voltage binning process. However, any optimal binning produces the same yield. Therefore, the computation is valid for any other optimal binning.

The problem of computing optimal voltage binning scheme $\hat{V}=\{V_1, V_2, \ldots, V_n\}$ is formulated as follows:

$$\max_{V_1, V_2, \ldots, V_n} Y \text{ s.t.} \begin{cases} V_1 > V_{min} \\ V_2 > V_1 \\ \ldots \\ V_n > V_{n-1} \\ V_n < V_{max}, \end{cases} \quad (9)$$

wherein Y is total yield corresponding to the bin voltage levels $\{V_1, V_2, \ldots, V_n\}$. Optimization constraints impose an ascending or descending order of voltage levels. For formulation of the optimization problem this order is not obligatory. However, without those constraints, the yield is a multimodal function of voltage levels, because any permutation transforms the vector of optimal voltages into another optimal solution. By imposing an ascending/descending order of voltage levels, duplicates of optimal solutions are removed, which simplifies the optimization calculation.

There are two special types of voltage binning schemes that are also being considered herein. The first type is a scheme with a single bin. Obviously, this is just the usual case with a single operational voltage. The second type is a scheme with infinite number of voltage bins with all possible voltage levels. This binning scheme describes the situation when supply voltage is individually tailored for each chip to meet timing and power constraints.

Optimal binning schemes have the following properties. Property 1: if optimal voltage binning scheme $S_1$ has n voltage levels, if optimal binning scheme $S_2$ has m voltage levels and if n<m, then binning scheme $S_1$ gives lower or equal yield than binning scheme $S_2$. Property 2: yield for chips with individually adjustable Vdd is an upper bound of yield for any other voltage binning scheme. Property 3: yield for single optimal value of supply voltage (optimal single voltage bin) is a lower bound for any optimal voltage binning scheme. These properties are used for verifying the computation of optimal binning schemes performed herein.

The techniques for computing and optimizing yield of various voltage binning schemes will now be described in detail. The first voltage binning scheme discussed has a single voltage bin. Computing yield for this binning scheme will now be described. In order to be good, a chip should satisfy requirements that its timing slack is positive S>0 and its power does not exceed a required limit $P<P_{lim}$. For a single Vdd (a single bin), parametric chip yield is a percentage of manufactured chips satisfying these constraints. Yield Y for a given voltage level $\Delta V$ is computed by direct integration in a space of process parameters:

$$Y = \iint_{\substack{S>0 \\ P>P_{lim}}} p(\Delta L, \Delta X) d\Delta L d X, \quad (10)$$

wherein $p(\Delta L, \Delta X)$ is the JPDF of variations of Leff and the combined parameter X (see above), S>0 and $P<P_{lim}$ are timing and power constraints defining the integration area in the process variation space. In order to simplify the presentation it is assumed that $\Delta L$ and $\Delta X$ are normalized Gaussians.

The simplest way to compute the integral in Equation 10 is with a Monte-Carlo technique. However, as highlighted above, Monte-Carlo integration is prone to numerical noise. For yield estimation this noise is acceptable. However, optimization is guided with variation of objective function with respect to optimization steps. Even small random noise confuses the optimization by making the objective function to be locally non-convex. In fact, a systematic deterministic inaccuracy is less harmful than this random noise. The computation of the objective function multiple times during optimization exacerbates the situation by increasing the probability of large errors.

Figure 6:
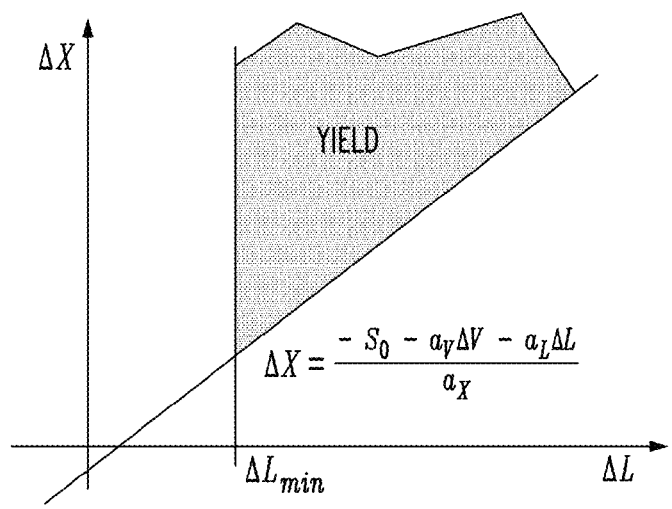
FIG. 6 is a diagram illustrating variational space for channel length variations $\Delta L$ and combined parameter variations $\Delta X$ for single Vdd yield according to an embodiment of the present invention.

Since there is no closed formula for this integral, a combination of numerical and analytical techniques were developed. FIG. 6 is a diagram 600 illustrating variational space for channel length $\Delta L$ and combined parameter $\Delta X$ for single Vdd yield. The gray area represents chip yield. Vertical line $\Delta L = \Delta L_{min}$ corresponds to power constraint $P<P_{lim}$. Value $\Delta L_{min}$ corresponds to a minimum Leff at which the power constraint is not violated. $\Delta L_{min}$ is calculated by numerically solving the equation $P(\Delta L_{min}) = P_{lim}$ where $P(\Delta L_{min})$ is total chip power considered as a function of Leff variation. Oblique line $\Delta X = (-S_0 - a_V \Delta V - a_L \Delta L)/a_X$ expresses timing constraint S>0, and is derived from the equation for timing slack, i.e., Equation 2, above. An upper bound on Leff variation is not set because a Gaussian distribution goes to zero very fast and the impact of high values of Leff is negligibly small. These two lines limit the area where chips satisfy timing and power constraints. An integral of Equation 10 over this area can be rewritten as an iterated integral:

$$Y = \frac{1}{2\pi} \int_{\Delta L_{min}}^{\infty} \int_{-\frac{S_0 - a_V \Delta V - a_L \Delta L}{a_X}}^{\infty} e^{-\frac{\Delta L^2 + \Delta X^2}{2}} d\Delta X \, d\Delta L. \quad (11)$$

By expressing the internal integral through the normalized Gaussian PDF $\phi$ and cumulative distribution function (CDF) $\Phi$, the formula for yield is simplified as:

$$Y = \int_{\Delta L_{min}}^{\infty} \phi(\Delta L) \Phi\left(\frac{S_0 + a_V \Delta V + a_L \Delta L}{a_X}\right) d\Delta L. \quad (12)$$

This integral can be efficiently computed numerically. It takes less than one second. This computational technique can be easily extended to the case of more variables affecting both chip power and timing. Then a two- or three-dimensional integral will have to be numerically computed, which is not difficult.

The next voltage binning scheme discussed has multiple voltage bins. Computing yield for this binning scheme will now be described. Assume, for example, that the voltage binning scheme has n voltage levels $V_1, V_2, \ldots, V_n$. Then a chip is good if it satisfies timing and power requirements at least at one supply voltage $V_i$. Mathematically yield can be expressed as follows:

$$Y = \int_{\bigcup_{i=1}^{n} \{S(V_i)>0, P(V_i)<P_{lim}\}} p(\Delta L, \Delta X) d\Delta L d\Delta X, \quad (13)$$

wherein integration is performed over the union of all the areas defined by the timing and power constraints corresponding to each supply voltage of the binning scheme. The technique described in conjunction with the description of a single bin voltage binning scheme, immediately above, is extended for computing this integral.

Figure 7:
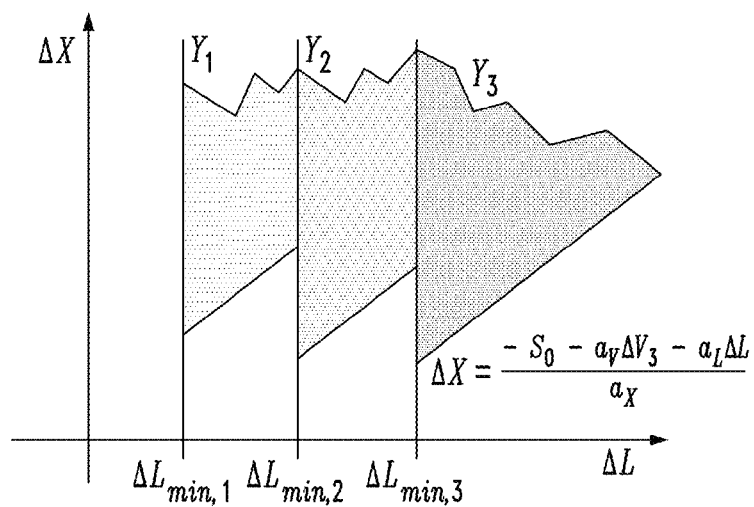
FIG. 7 is a diagram illustrating variational space for channel length variations $\Delta L$ and combined parameter variations $\Delta X$ for multiple Vdd bins according to an embodiment of the present invention.

FIG. 7 is a diagram 700 illustrating variational space for channel length variations $\Delta L$ and combined parameter variations $\Delta X$ for multiple Vdd bins. The gray area constitutes chip yield. It is bounded by three vertical lines $\Delta L = \Delta L_{min,i}$ and three oblique lines $\Delta X=(-S_0-a_V \Delta V_i-a_L \Delta L)/a_X$. Each vertical line $\Delta L=\Delta L_{min,i}$ corresponds to power constraint $P(\Delta L_{min,i})<P_{lim,i}$. Each oblique line $\Delta X=(-S_0-a_V \Delta V_i-a_L \Delta L)/a_X$ corresponds to timing constraint $S(\Delta V_i, \Delta L, \Delta X)=0$. The formula for the oblique lines is derived from the expression for timing slack (Equation 2). The whole yield area in FIG. 6 can be divided into three subregions marked $Y_1$, $Y_2$ and $Y_3$. Two of these subregions are bounded by two vertical lines and by one oblique line. The third subregion is bounded by one vertical and one oblique line. The chip yield can be represented as $Y=Y_1+Y_2+Y_3$.

For the general case, the total yield for a binning scheme with n voltages $V_1, V_2, \ldots, V_n$ is represented as the sum of the yields corresponding to n subregions:

$$Y = \sum_{i=1}^{n} Y_i. \tag{14}$$

The term $Y_n$ corresponds to the region bounded by one vertical line and one oblique line. The term $Y_n$ can be efficiently computed using Equation 12, above. The other terms $Y_i$ with $i<n$ correspond to the regions bounded by two vertical lines $\Delta L=\Delta L_{min,i}$, $\Delta L=\Delta L_{min,i+1}$ and one oblique line $\Delta X=(-S_0-a_V \Delta V_i-a_L \Delta L)/a_X$. These terms are computed as:

$$Y_i = \int_{\Delta L_{min,i}}^{\Delta L_{min,i+1}} \phi(\Delta L) \Phi\left(\frac{S_0 + a_V \Delta V_i + a_L \Delta L}{a_X}\right) d\Delta L. \tag{15}$$

Having derived efficient and accurate formulas and numerical procedures for yield computation, the problem of computing optimal voltage levels, i.e., the problem of computing the optimal binning scheme of Equation 9, above, is now solved. The present teachings can be used for computing yield derivatives with respect to Vdd levels. However, it has been found that even optimization without derivatives by a simplex Nelder and Mead method (see, for example, W.H. Press et al., "Numerical Recipes in C, the art of scientific computing" Cambridge University Press (1992)) gives good results.

In general, a Nelder and Mead optimization method works by making steps of moving and transforming a simplex in N dimensional optimization space. A simplex is a geometrical figure in N dimensional space consisting of N+1 points (vertices) and all their interconnecting line segments, polygonal faces, etc. A two-dimensional simplex is a triangle. A three-dimensional simplex is a tetrahedron. The movement of the simplex is performed by such transformation of its shape as a reflection of one if its vertices with respect to an opposite N−1 dimensional face, expansion or contraction in one of a number of possible directions and combinations of these operations. At each step, the optimization method selects a proper transformation according to behavior of the function to be optimized (minimized of optimized), trying to move the simplex to the point of the function optimum. The size of the simplex controls the size of the steps.

With regard to the present teachings, an optimizer from Matlab implementing the Nelder and Mead optimization method may be used (although any other suitable optimization method might be similarly employed). Benefits of using the Nelder and Mead optimization method with the present teachings include the fact that the Nelder and Mead optimization method does not require derivatives of a target function (yield) with respect to parameters to be varied (bin voltages) and that the Nelder and Mead optimization method can be used to obtain an optimal solution quickly.

Figure 8:
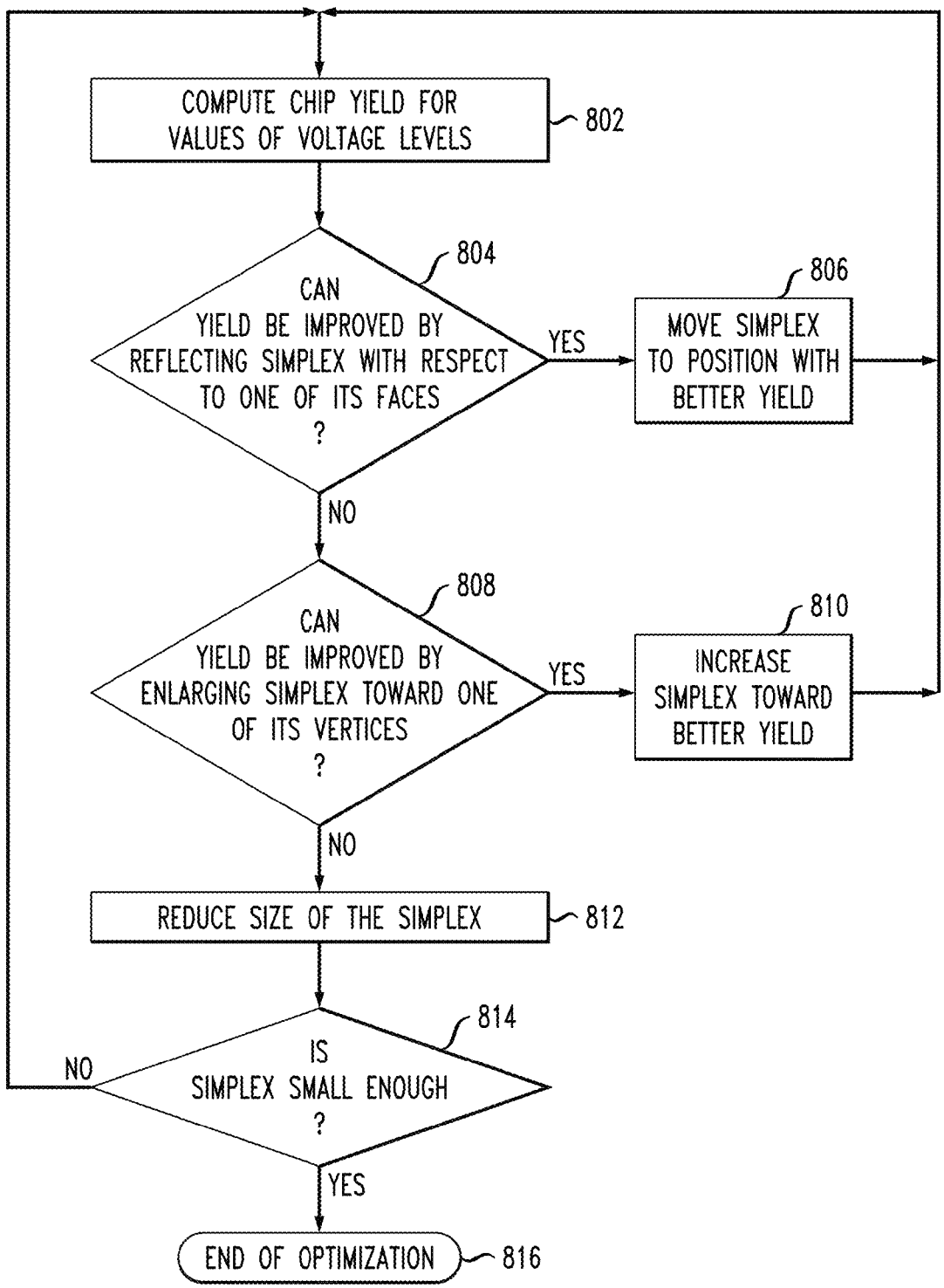
FIG. 8 is a diagram illustrating an exemplary methodology for determining optimal yield according to an embodiment of the present invention.

FIG. 8 is a diagram illustrating exemplary methodology 800 for optimizing parametric yield of manufactured chips. Methodology 800 represents one specific implementation of methodology 100 of FIG. 1 using Nelder and Mead optimization. Other optimization techniques may be implemented in the context of methodology 100 and FIG. 8 merely provides one example. In step 802, chip yield is computed for sets of voltage levels (variables to vary) that are part of a given voltage binning scheme. Step 802 is synonymous with step 102 of FIG. 1 being performed on a given voltage binning scheme. In the first iteration of methodology 800, in step 802 chip yield is computed for some initial sets of voltage levels. In subsequent iterations of methodology 800, as will be described in detail below, in step 802 chip yield is computed for neighboring values to the initial voltage levels. The techniques for determining chip yield were described in detail above.

In step 804, a determination is made as to whether or not the chip yield can be improved by reflecting a simplex with respect to one of its faces. In this example, neighboring values to the initial sets of voltage levels are obtained using a Nelder and Mead optimization method. As described above, the Nelder and Mead optimization method works by making steps of moving and transforming a simplex in N dimensional optimization space. A simplex is a geometrical figure in N dimensional space consisting of N+1 points (vertices) and all their interconnecting line segments, polygonal faces, etc. The specific details of the Nelder and Mead optimization method that are generally used to explore neighboring values using a simplex, and the operations performed using the simplex, such as reflecting the simplex with respect to its face(s) and/or enlarging/reducing simplex size (see below), are known to those of skill in the art and thus are not described further herein.

If the chip yield can be improved by reflecting the simplex with respect to one of its faces, then in step 806 the simplex is moved to a position with better yield (i.e., encompassing a neighboring set of values that provide better yield than the initial sets of voltage levels (or than values from a previous iteration of the process)). The process is then repeated beginning at step 802 using these neighboring values.

On the other hand, if the chip yield cannot be improved by reflecting the simplex with respect to one of its faces, then in step 808 a determination is made as to whether or not the chip yield can be improved by enlarging the simplex toward one of its vertices. If the chip yield can be improved by enlarging the simplex toward one of its vertices, then in step 810, the simplex size is increased (i.e., to encompass a neighboring set of values that provide better yield than the initial sets of voltage levels (or than values from a previous iteration of the process)). The process is then repeated beginning at step 802 using these neighboring values.

On the other hand, if the chip yield cannot be improved by enlarging the simplex toward one of its vertices, then in step 812 the simplex size is decreased (i.e., to encompass a neighboring set of values that provide better yield than the initial sets of voltage levels (or than values from a previous iteration of the process)). In step 814, a determination is then made as to whether or not the simplex is small enough, i.e., whether or not the simplex can be further reduced in size to include closer neighboring points. By way of example only, the simplex may be considered small enough when it converges on the initial points (or points from a previous iteration of the process) and all neighboring points have been considered. Steps 804-814 are synonymous with steps 104 and 106 of FIG. 1 wherein it is determined whether or not yield is optimal and, if it is not, Vdd levels are updated.

If the simplex is small enough, it means that all neighboring points are worse than the current points and in step 816 it is concluded that an optimal point has been reached and the optimization process is complete. Step 816 is synonymous with step 106 of FIG. 1 wherein optimal Vdd levels are reached. On the other hand, if the simplex is not small enough, the process is then repeated beginning at step 802 using the current voltage values.

Alternatively, the determination as to whether the yield is optimal or not (e.g., step 104 of FIG. 1) can be performed by computing yield for all possible values of voltages. This techniques takes more time than methodology 800 described above, but can be helpful for schemes involving a small number of bins. There are also other optimization methodologies without derivatives that have much better convergence. Moreover, optimization methodologies using derivatives of the target function with respect to parameters to be varied have even better convergence properties, and can be used herein.

Now considered is the case where each chip can be assigned its own individual supply voltage to meet timing and power constraints. Determining yield for such an adjustable supply voltage scenario will now be described. Obviously it is the same as having an infinite number of voltage bins. Therefore, the yield for this case can be expressed as the limit of optimal binning as the number of bins approaches infinity. However, its computation as a limit is not convenient and a more efficient technique is needed.

Just as timing and power constraints are formulated in terms of deviation of Vdd from its nominal value $V_0$, chip yield is expressed in terms of this deviation $\Delta V$ as well. The yield Y for chips with individually adjustable supply voltage in the interval of voltage variations $[\Delta V_{min}, \Delta V_{max}]$ is expressed as the probability that there exists supply voltage in this interval such that both the timing and power constraints are satisfied:

$$Y = \text{Prob}(\exists \Delta V | S(\Delta V, \Delta L, \Delta X) > 0, P(\Delta V, \Delta L) < P_{lim}, \Delta V_{min} < \Delta V < \Delta V_{max}). \quad (16)$$

Equation 16 correctly defines yield of the chips with individually adjustable Vdd, but is not helpful for actual calculation. Therefore, Equation 16 is transformed to an integral that is more suitable for computation:

$$Y = \iint_{\substack{S(\Delta V, \Delta L, \Delta X) > 0 \\ P(\Delta V, \Delta L) < P_{lim} \\ \Delta V_{min} < \Delta V < \Delta V_{max}}} p(\Delta L, \Delta X) d\Delta L \Delta X. \quad (17)$$

Figure 9:
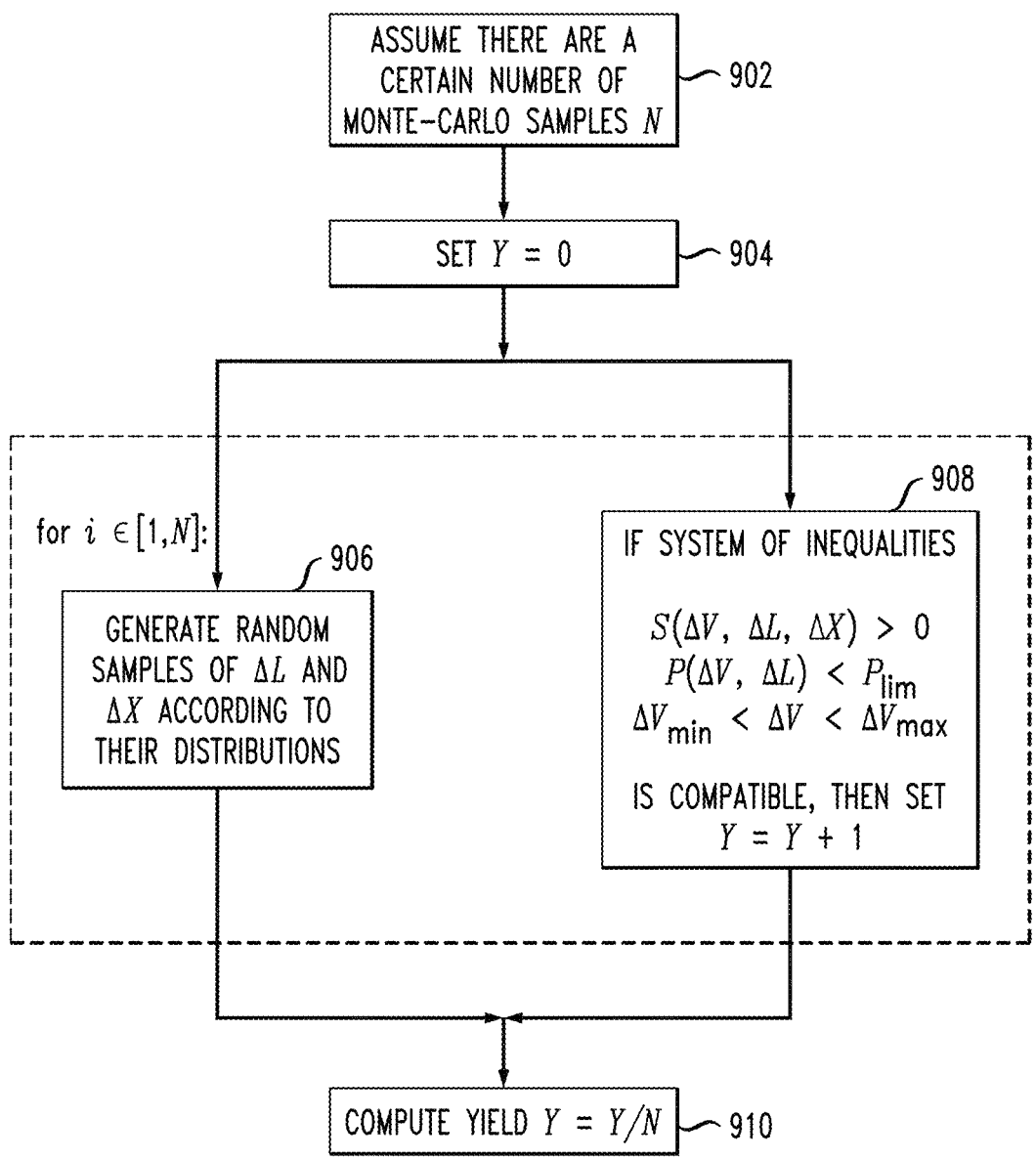
FIG. 9 is a diagram illustrating an exemplary Monte-Carlo process according to an embodiment of the present invention.

The integration in Equation 17 is performed across an area where the system of inequalities has at least one solution. This integral can be computed by a Monte-Carlo process like that shown in FIG. 9. Specifically, FIG. 9 is a diagram illustrating exemplary Monte-Carlo process 900 for performing the integration in Equation 17. In step 902, it is assumed that there are a certain number of Monte-Carlo samples N. In step 904, yield Y is set to zero, i.e., Y=0. Next, for $i \in [1, N]$, random samples of $\Delta L$ and $\Delta X$ are generated according to their distributions (step 906) and if the system of inequalities $$S(\Delta V, \Delta L, \Delta X) > 0$$

$$P(\Delta V, \Delta L) < P_{lim}$$

$$\Delta V_{min} < \Delta V < \Delta V_{max} \quad (18)$$

is compatible, then set Y=Y+1 (step 908). In step 910, yield Y=Y/N is computed.

The only computationally unusual thing here is checking feasibility of the system of inequalities which is not difficult to do because both timing slack and power have analytical expressions. Substituting into these expressions the sampled values of $\Delta L$ and $\Delta X$, a system of inequalities is obtained with only one variable $\Delta V$. Then checking its feasibility is straightforward, especially taking into account that here both timing slack and power are monotonic functions of supply voltage. A Monte-Carlo technique is suitable for computing this integral because it is not being used in an optimization procedure. Therefore, the random numerical noise does not create any additional problems.

The present teachings are further described by way of reference to the following non-limiting examples. The present techniques were verified by analyzing three large industrial chips with strict requirements on power consumption. The leakage of library cells was characterized as a function of Vdd and Leff using SPICE simulations. Library cells are digital cells (logic gates, latches, flip-flops, etc.) of a library used for designing chips for a given technology. Library cells are well known to those of skill in the art and thus are not described further herein. Vdd was varied from one volt to 1.4 volts. Leff was varied from 80 nanometers (nm) to 100 nm. 41 points were used for Vdd and 21 points were used for Leff variations, which makes a total of 861 points for all Vdd and Leff combinations.

Figure 10A:
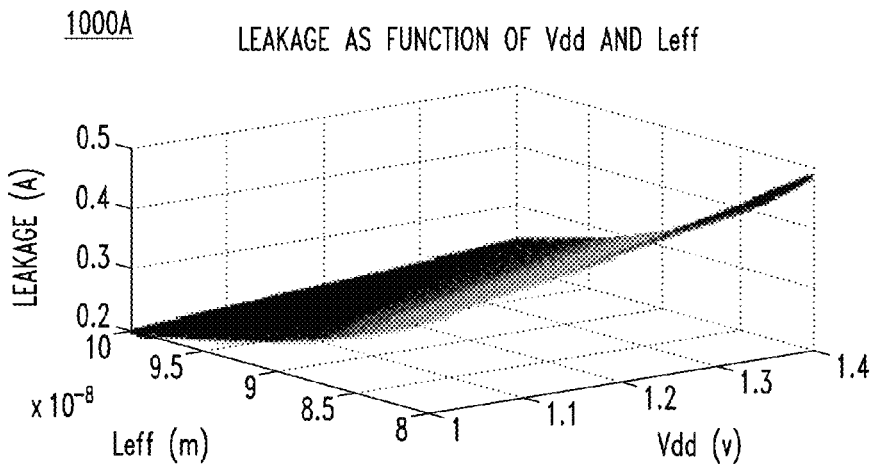
FIGS. 10A-C are plots illustrating leakage as a function of Vdd and channel length (Leff) according to an embodiment of the present invention.
Figure 10B:
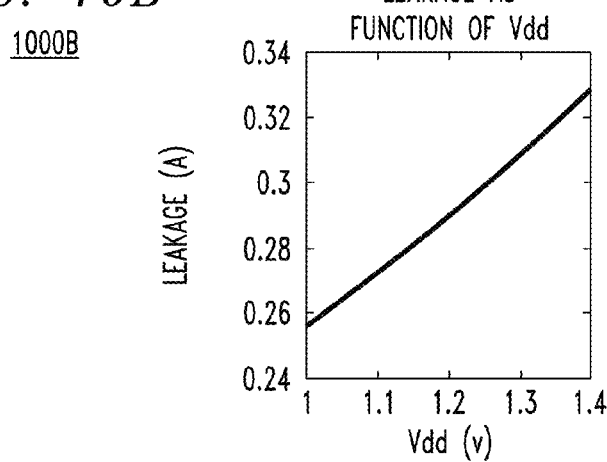
Figure 10C:
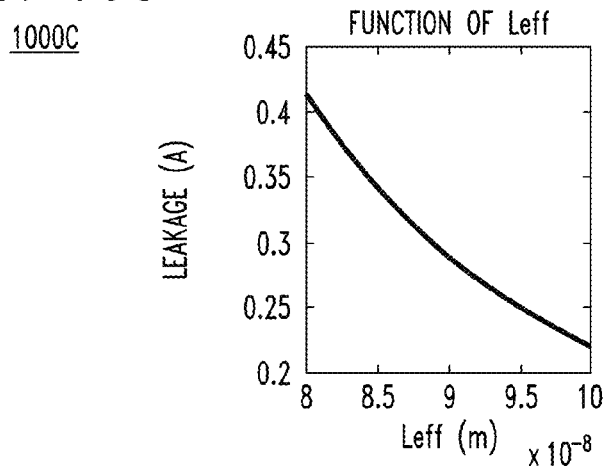

The total leakage of each chip was calculated by summing the leakage of all cells (i.e., instances of library cells). Each library cell can be used in a chip multiple times for performing some operations in a chip circuit. A library typically has hundreds of cells. A chip typically has millions of library cells because each cell may be used in the chip multiple times. FIGS. 10A-C are plots 1000A, 1000B and 1000C, respectively, illustrating leakage as a function of Vdd and Leff. Specifically, plot 1000A (of FIG. 10A) shows in three-dimensions chip leakage current (measured in amps (A)) as a function of Vdd (measured in volts (v)) and Leff (measured in meters (m)). Plot 1000B (of FIG. 10B) shows chip leakage current (measured in A) as a function of Vdd (measured in v) and plot 1000C (of FIG. 10C) shows chip leakage current (measured in A) as a function of Leff (measured in m). Plots 1000B and 1000C show the variation of leakage current when either Leff or Vdd is fixed. From these plots a strong dependence of leakage both on Vdd and Leff is seen.

Figure 11:
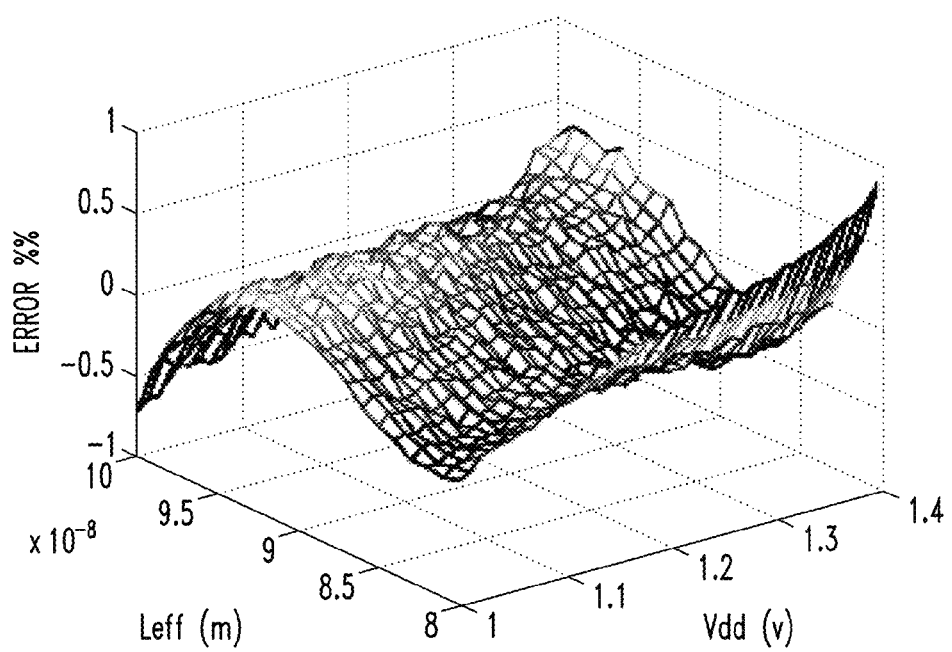
FIG. 11 is a plot illustrating error of leakage approximation according to an embodiment of the present invention.

The tabulated function of chip leakage was fit to the exponent of quadratic form of Equation 6 using Matlab. For efficiency, the logarithm of leakage current was fit to the quadratic form of Vdd and Leff. This approach helped to perform fitting in less than one minute. FIG. 11 is a plot 1100 illustrating error of leakage approximation as a function of Vdd and Leff for one of the three chips (chip 3). Plot 1100 shows % error as a function of Vdd (measured in v) and Leff (measured in m). The maximum error is only 0.91%. For the other two chips the error was within 0.84% and 0.78%, which confirms the accuracy and robustness of the present approximation technique. The total chip power was computed by summing its leakage and switching power. The switching power was estimated from chip switching activity and load capacitances of logic gates.

The proposed technique also requires chip slack in a linear canonical form of Equation 2, above. The chip slack was computed by statistical timing analysis. Fifteen sources of variation were used in modeling variability of transistors and interconnects. For yield analysis all components of the chip slack except variations due to Vdd and Leff were combined statistically into a single term.

Figure 12:
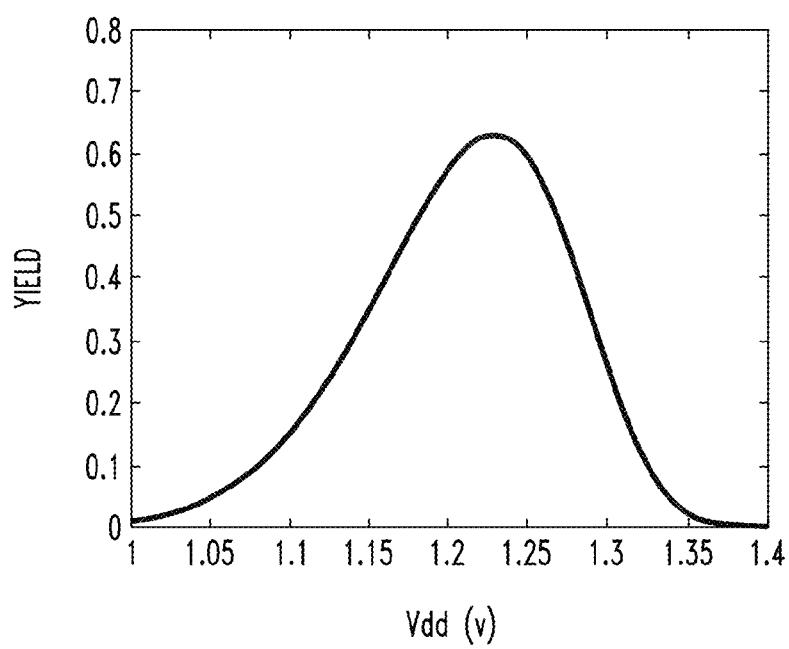
FIG. 12 is a plot illustrating chip yield as a function of Vdd according to an embodiment of the present invention.

For validating the analytical formulas of chip yield computation, yield computation using Equation 12, above, was compared with a Monte-Carlo calculation of chip yield for different Vdd values. The Monte-Carlo calculation used 105 samples to guarantee sufficient accuracy. The maximum difference between Monte-Carlo and the present technique was only 0.44%. Similar results were obtained for a case involving two voltage bins. FIG. 12 is a plot 1200 illustrating chip yield as a function of Vdd (measured in v). Plot 1200 shows that chip yield strongly depends on Vdd and achieves its maximum at some Vdd value.

Figures 13, 14:
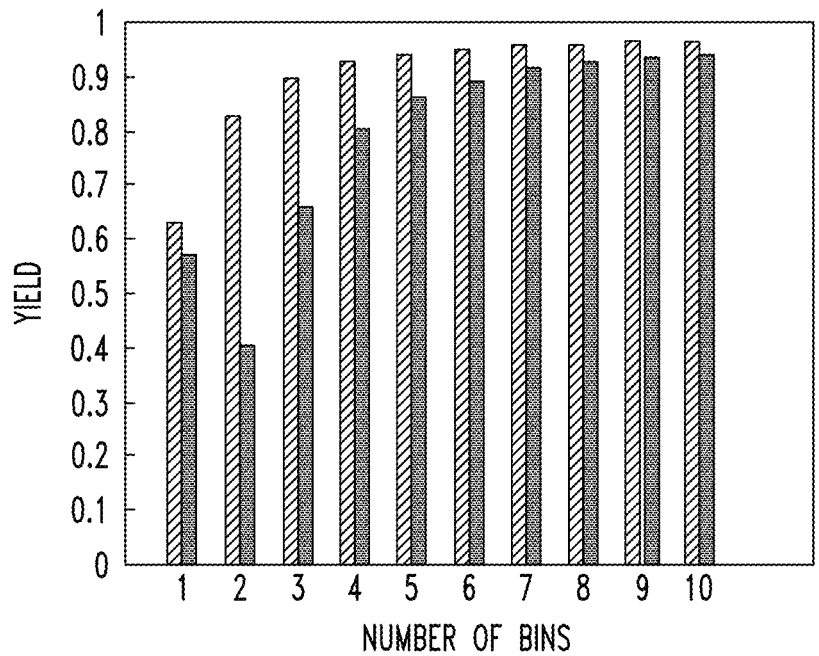
FIG. 13 is a table displaying results of an experiment where computation of optimal Vdd levels for binning schemes with varying number of bins was performed for three industrial chips according to an embodiment of the present invention.
FIG. 14 is a plot illustrating chip yield for different binning schemes according to an embodiment of the present invention.

The next step performed was computation of optimal Vdd levels for binning schemes with varying number of bins. FIG. 13 is a table 1300 displaying the results of this experiment for three industrial chips. Taken from left to right, the first column of table 1300 (with header "Design") gives the name of the chip, i.e., chip 1, chip 2, etc. The second column of table 1300 (with header "Adj Vdd") shows percent chip yield when Vdd is adjusted individually for each manufactured chip. In this case all three chips have pretty high yield. The third through seventh columns (with headers "1 bin," "2 bins," etc.) give percent chip yield values for optimal binning with 1, 2, 3, 5 and 10 bins, respectively. It has been found that chip yield always increases when the number of bins is increased, but it never exceeds the yield corresponding to individually adjustable Vdd (first column). The binning schemes were analyzed with as many as 10 bins in order to verify that the chip yield for a large number of bins gets close to the yield corresponding to individually adjustable Vdd. Table 1300 confirms all of the above theoretical predictions. Table 1300 also shows that voltage binning can significantly improve yield. For example, using three bins gives 81.7% yield comparing with only 44% yield for single optimal Vdd value. The computation time was insignificant (about one minute) even for the case of 10 bins.

FIG. 14 is a plot 1400 illustrating chip yield for different binning schemes (i.e., for different numbers of bins). Specifically, plot 1400 shows two histograms of chip yield for voltage binning with the number of bins varying from one to 10. For each bin number two bars are shown. For each pair of bars, the bar on the left shows yield for optimal binning and the bar on the right shows yield for uniform binning, i.e., binning with Vdd values uniformly distributed between minimum and maximum Vdd values. As expected, optimal binning always provides higher yield. Obviously, the difference between optimal and uniform voltage binning reduces when the number of bins gets large. As shown in plot 1400, the uniform binning yield decreases when the number of voltage bins is increased from one to two. This happens because the single optimal Vdd is close to the middle of the Vdd interval but the two uniformly distributed Vdd values are far from the optimal values.

Figures 15, 16:
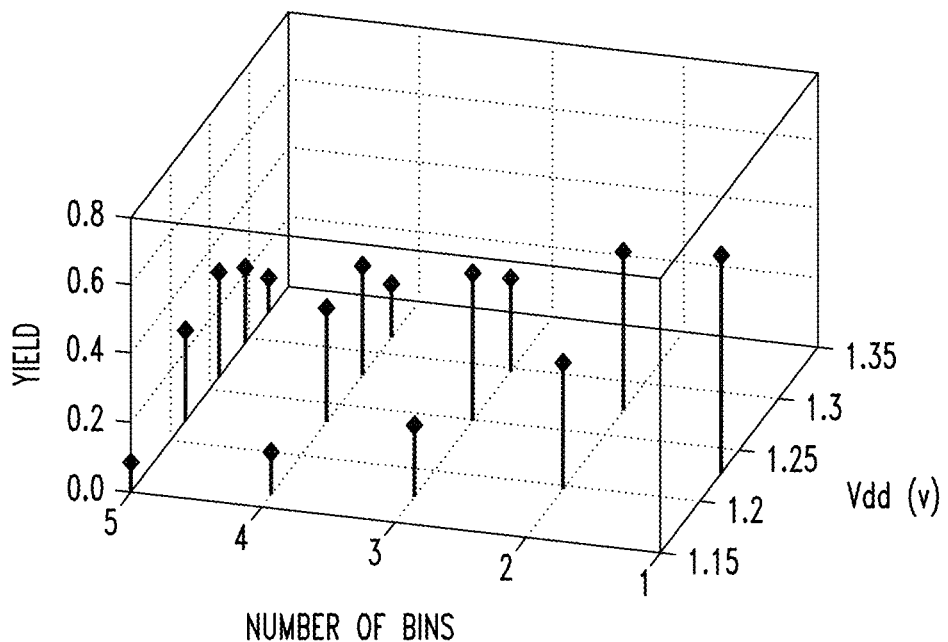
FIG. 15 is a plot illustrating voltage bin size and distribution for five optimal voltage binning schemes according to an embodiment of the present invention.
FIG. 16 is a table displaying yield dependence on power requirements according to an embodiment of the present invention.

FIG. 15 is a plot 1500 illustrating voltage bin size and bin distribution for five optimal voltage binning schemes. The voltage bin size is the number of chips in a bin as a fraction of the total number of chips fabricated. One horizontal axis gives the number of bins in the binning schemes. In this example, five binning schemes with 1, 2, 3, 4, 5 bins are presented. The other horizontal axis gives Vdd values of the voltage bins (measured in v). Chip yield is given on the vertical axis. The stems growing from the horizontal plane correspond to the bins of the binning schemes.

The coordinates of a stem root indicate the number of bins in the corresponding binning scheme and the Vdd of the corresponding bin. The height of each stem is the amount of yield obtained from the corresponding bin. Clearly, the optimization improves yield by distributing Vdd values non-uniformly among the bins.

Voltage binning provides an opportunity to improve yield for very strict power constraints. This opportunity was analyzed by computing optimal binning for different power requirements. FIG. 16 is a table 1600 displaying chip yield dependence on power requirements. Specifically, table 1600 shows parametric chip yield for the same chip with different optimal binning schemes and power requirements.

Taken from left to right, the first column of table 1600 (with header "Power constr") shows power constraints as a percentage of the initial target value. Usually the less power a chip consumes the better. However, there is generally a target power constraint or simply power constraint that any chip with power consumption higher than that is considered bad. However, the power constraint cannot be too strict because then the yield will be very low. The goal of this example is to show that by applying optimal voltage binning with voltages computed by the present techniques it is possible to achieve high yield even for power constraints that are stricter that the one considered as a target. As described below, the results in table 1600 indicate that this is really possible to do. Power constraints were varied from the initial target value down to 75% of the initial target value. The second column of table 1600 (with header "Adj Vdd") shows percent chip yield when each manufactured chip is assigned an individually adjusted optimal Vdd. The third through seventh columns (with headers "1 bin," "2 bins," etc.) give yield values for binning schemes with different numbers of bins.

Table 1600 shows that voltage binning can significantly improve yield even for very strict power requirements. For instance, when a power constraint is 25% stricter than nominal, single Vdd gives only 14.3% yield but just three bins improve yield up to 27.1%, while 10 bins improves yield up to 37.1%.

Figure 17:
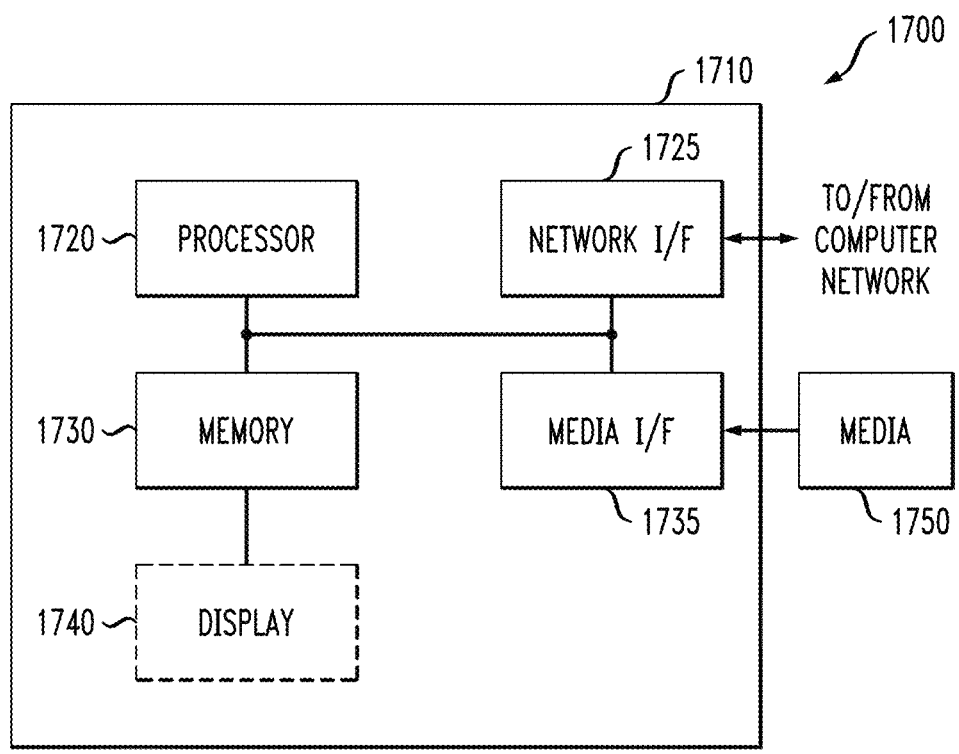
FIG. 17 is a diagram illustrating an exemplary apparatus for optimizing parametric yield of manufactured chips according to an embodiment of the present invention.

Turning now to FIG. 17, a block diagram is shown of an apparatus 1700 for optimizing parametric chip yield, in accordance with one embodiment of the present invention. It should be understood that apparatus 1700 represents one embodiment for implementing methodology 100 of FIG. 1.

Apparatus 1700 comprises a computer system 1710 and removable media 1750. Computer system 1710 comprises a processor device 1720, a network interface 1725, a memory 1730, a media interface 1735 and an optional display 1740. Network interface 1725 allows computer system 1710 to connect to a network, while media interface 1735 allows computer system 1710 to interact with media, such as a hard drive or removable media 1750.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to compute parametric chip yield based on performance and power consumption of a plurality of manufactured chips subject to a given voltage binning scheme; determine whether the parametric chip yield computed is optimal; and alter the voltage binning scheme and repeat the compute and determine steps if the parametric chip yield is not optimal, otherwise leave the binning scheme unaltered.

The machine-readable medium may be a recordable medium (e.g., floppy disks, hard drive, optical disks such as removable media 1750, or memory cards) or may be a transmission medium (e.g., a network comprising fiber-optics, the world-wide web, cables, or a wireless channel using timedivision multiple access, code-division multiple access, or other radio-frequency channel). Any medium known or developed that can store information suitable for use with a computer system may be used.

Processor device 1720 can be configured to implement the methods, steps, and functions disclosed herein. The memory 1730 could be distributed or local and the processor device 1720 could be distributed or singular. The memory 1730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1720. With this definition, information on a network, accessible through network interface 1725, is still within memory 1730 because the processor device 1720 can retrieve the information from the network. It should be noted that each distributed processor that makes up processor device 1720 generally contains its own addressable memory space. It should also be noted that some or all of computer system 1710 can be incorporated into an application-specific or general-use integrated circuit.

Optional video display 1740 is any type of video display suitable for interacting with a human user of apparatus 1700. Generally, video display 1740 is a computer monitor or other similar video display.

In conclusion, the present teachings provide techniques for yield computation and optimization for different voltage binning schemes which use the results of statistical timing analysis and chip leakage expressed in functional form. In experimental implementations of the present teachings, chip leakage was approximated as an exponential of quadratic form of Vdd and Leff. It was demonstrated that this approximation has less than one % error. However, the present technique of analyzing and optimizing voltage binning can be adapted to other representations of chip leakage and switching power. The experimental examples provided above show that optimal voltage binning is able to more than double parametric yield for strict power requirements. The proposed methods demonstrated high computational efficiency and require only a few minutes of central processing unit (CPU) time.

Although illustrative embodiments of the present invention have been described herein, it is to be understood that the invention is not limited to those precise embodiments, and that various other changes and modifications may be made by one skilled in the art without departing from the scope of the invention. The contents of each of the references mentioned above are hereby incorporated by reference herein.

What is claimed is:

1. A method for optimizing parametric chip yield, comprising the steps of:
computing parametric chip yield based on performance and power consumption of a plurality of manufactured chips subject to a given voltage binning scheme having multiple voltage bins, wherein the voltage binning scheme includes a set of supply voltage levels and a set of voltage bins corresponding to the supply voltage levels, and wherein the voltage binning scheme comprises, for each of the manufactured chips, i) finding highest voltage level $V_i$ at which the chip satisfies power consumption constraints, ii) testing chip performance for supply voltage equal to $V_i$, iii) determining whether the chip performance meets timing constraints, and iv) assigning the chip to a voltage bin $U_i$ with voltage level equal to $V_i$ if the chip meets the timing constraints, otherwise rejecting the chip;
determining whether the parametric chip yield computed is optimal with the given voltage binning scheme, wherein the parametric chip yield is optimal when each of the chips which satisfies the power consumption constraints and the timing constraints of at least one of the voltage bins is assigned to one of the voltage bins; and
if the parametric chip yield is not optimal altering the voltage binning scheme and repeating the steps of computing the parametric chip yield and determining whether the parametric chip yield computed is optimal, otherwise leaving the voltage binning scheme unaltered, wherein the method is carried out by a computer device having a processor configured to perform the steps.

2. The method of claim 1, further comprising the step of:
computing the performance of the plurality of chips in terms of timing slack in a linear form.

3. The method of claim 2, further comprising the step of:
using statistical timing analysis to compute the performance of the plurality of chips in terms of timing slack in a linear form.

4. The method of claim 1, further comprising the step of:
expressing the power consumption of the plurality of chips in a parameterized form.

5. The method of claim 4, further comprising the step of:
expressing the power consumption of the plurality of chips as an exponent of a quadratic form.

6. The method of claim 1, wherein the computing step further comprises the step of:
computing the parametric yield by a combination of numerical and analytical techniques.

7. The method of claim 1, wherein the computing step further comprises the step of:
computing the parametric yield in a process variation space.

8. The method of claim 1, further comprising the step of:
ordering the voltage levels for optimization.

9. The method of claim 1, wherein the altering step further comprises the step of:
altering the voltage levels of one or more of the bins.

10. The method of claim 1, wherein the altering step further comprises the step of:
changing a number of bins in the set of bins.

11. The method of claim 10, wherein the altering step further comprises the step of:
increasing the number of bins.

12. The method of claim 1, wherein the computing step further comprises the step of:
computing the parametric yield by an integral over a process variation space.

13. The method of claim 12, further comprising the step of:
using the computed parametric yield as an upper bound of chip yield for any other voltage binning scheme.

14. An article of manufacture for optimizing parametric chip yield, comprising a non-transitory computer readable medium containing computer instructions stored therein for causing a computer processor to implement the steps of:
computing parametric chip yield based on performance and power consumption of a plurality of manufactured chips subject to a given voltage binning scheme having multiple voltage bins, wherein the voltage binning scheme includes a set of supply voltage levels and a set of voltage bins corresponding to the supply voltage levels, and wherein the voltage binning scheme comprises, for each of the manufactured chips, i) finding highest voltage level $V_i$ at which the chip satisfies power consumption constraints, ii) testing chip performance for supply voltage equal to $V_i$, iii) determining whether the chip performance meets timing constraints, and iii) assigning the chip to a voltage bin $U_i$ with voltage level equal to $V_i$ if the chip meets the timing constraints, otherwise rejecting the chip;

determining whether the parametric chip yield computed is optimal with the given voltage binning scheme, wherein the parametric chip yield is optimal when each of the chips which satisfies the power consumption constraints and the timing constraints of at least one of the voltage bins is assigned to one of the voltage bins; and if the parametric chip yield is not optimal altering the voltage binning scheme and repeating the steps of computing the parametric chip yield and determining whether the parametric chip yield computed is optimal, otherwise leaving the voltage binning scheme unaltered.

15. An apparatus for optimizing parametric chip yield, the apparatus comprising:

a memory; and at least one processor device, coupled to the memory, operative to:

compute parametric chip yield based on performance and power consumption of a plurality of manufactured chips subject to a given voltage binning scheme having multiple voltage bins, wherein the voltage binning scheme includes a set of supply voltage levels and a set of voltage bins corresponding to the supply voltage levels, and wherein the voltage binning scheme comprises, for each of the manufactured chips, i) finding highest voltage level $V_i$ at which the chip satisfies power consumption constraints, ii) testing chip performance for supply voltage equal to $V_i$, iii) determining whether the chip performance meets timing constraints, and iv) assigning the chip to a voltage bin $U_i$ with voltage level equal to $V_i$ if the chip meets the timing constraints, otherwise rejecting the chip;

determine whether the parametric chip yield computed is optimal with the given voltage binning scheme, wherein the parametric chip yield is optimal when each of the chips which satisfies the power consumption constraints and the timing constraints of at least one of the voltage bins is assigned to one of the voltage bins; and if the parametric chip yield is not optimal alter the voltage binning scheme and repeat computing the parametric chip yield and determining whether the parametric chip yield computed is optimal, otherwise leave the voltage binning scheme unaltered.

* * * * *